United States Patent [19]
Estelle

[11] Patent Number: 5,991,096
[45] Date of Patent: Nov. 23, 1999

[54] ZOOM LENS

[75] Inventor: Lee R. Estelle, Rochester, N.Y.

[73] Assignee: Eastman Kodak Company, Rochester, N.Y.

[21] Appl. No.: 08/925,692

[22] Filed: Sep. 9, 1997

[51] Int. Cl.[6] .................................................. G02B 15/14
[52] U.S. Cl. ......................... 359/694; 359/689; 359/691
[58] Field of Search ................................ 359/676–692, 359/694, 695, 699, 700, 701

[56] References Cited

U.S. PATENT DOCUMENTS

| | | | |
|---|---|---|---|
| 4,890,904 | 1/1990 | Ito | 359/680 |
| 5,042,927 | 8/1991 | Ogawa et al. | 359/676 |
| 5,218,478 | 6/1993 | Itoh | 359/692 |
| 5,231,541 | 7/1993 | Han | 359/841 |
| 5,235,466 | 8/1993 | Ono et al. | 359/684 |
| 5,241,420 | 8/1993 | Yamanashi | 359/682 |
| 5,247,393 | 9/1993 | Sugawara | 359/690 |
| 5,296,969 | 3/1994 | Mihara | 359/687 |
| 5,327,290 | 7/1994 | Fukushima et al. | 359/692 |
| 5,446,592 | 8/1995 | Kohno et al. | 359/689 |
| 5,793,536 | 8/1998 | Sato | 359/691 |

*Primary Examiner*—Huy Mai
*Attorney, Agent, or Firm*—Svetlana Z. Short

[57] ABSTRACT

A zoom lens comprises a plurality of lens elements arranged in at least two zooming lens units. The zoom lens is characterized in that at least one of the zooming lens units moves in a first direction, then reverses the direction of the movement to move in a second direction and then reverses the direction again to move in the first direction.

11 Claims, 7 Drawing Sheets

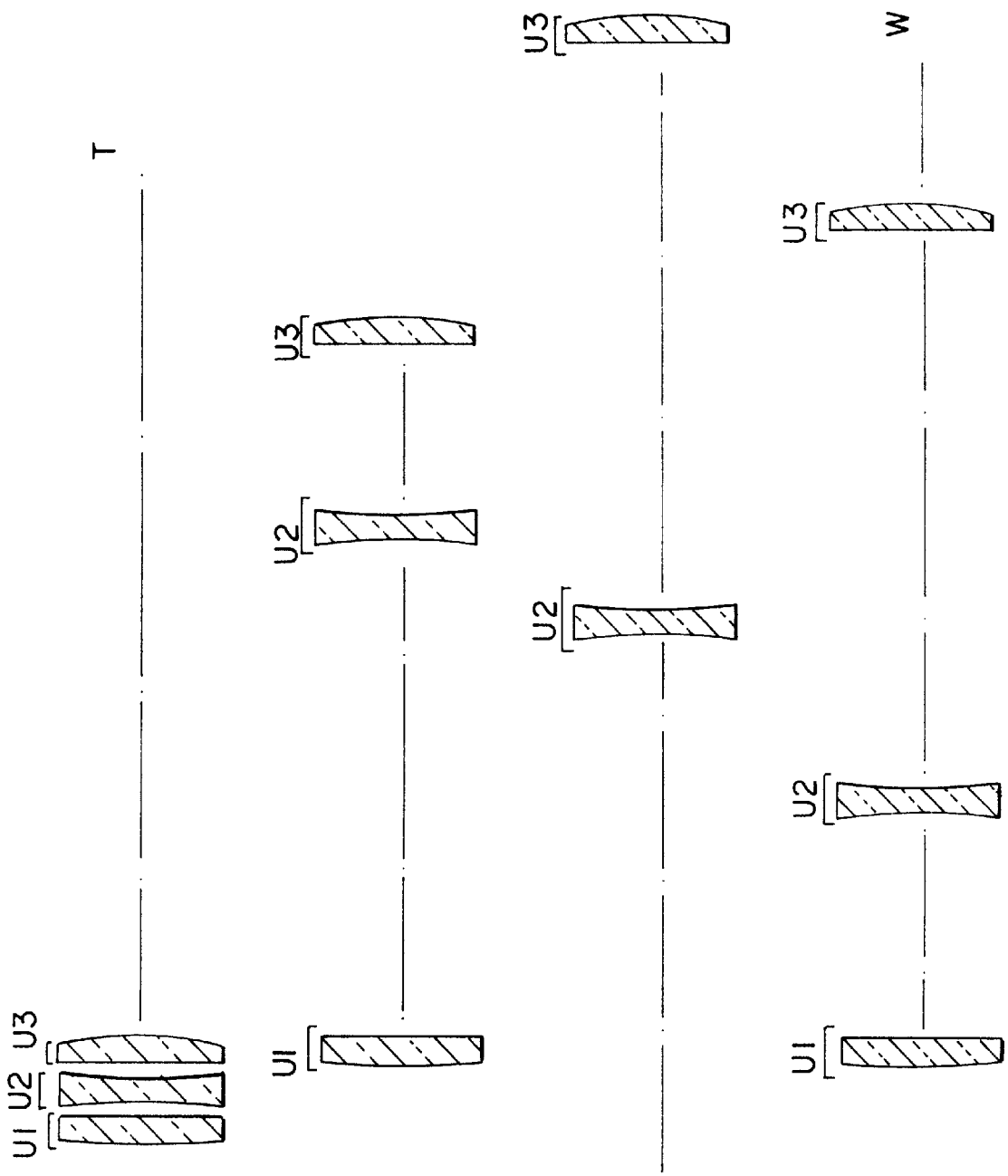

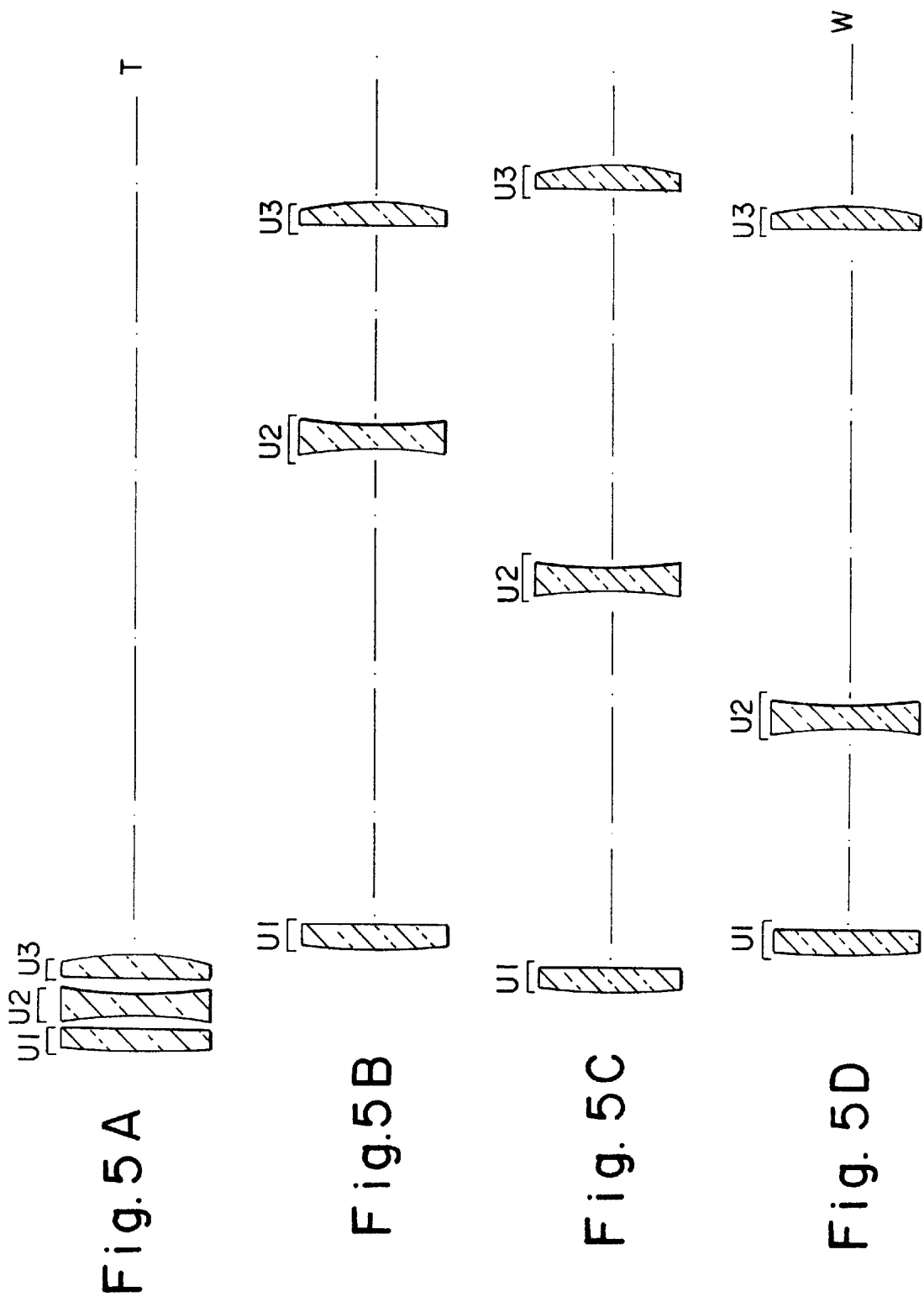

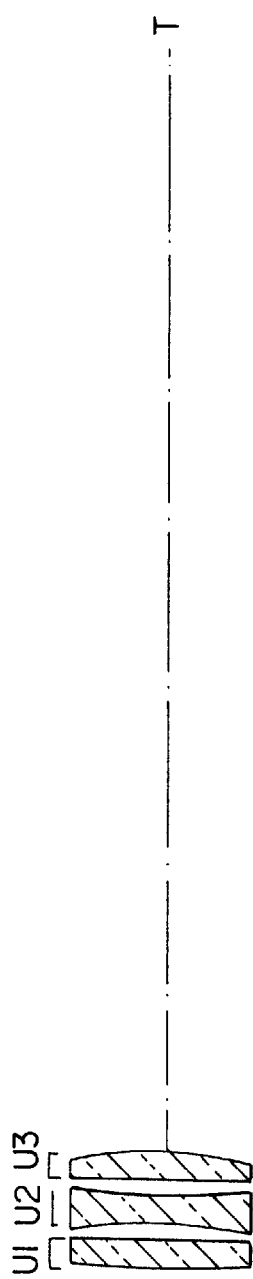
Fig. 6A
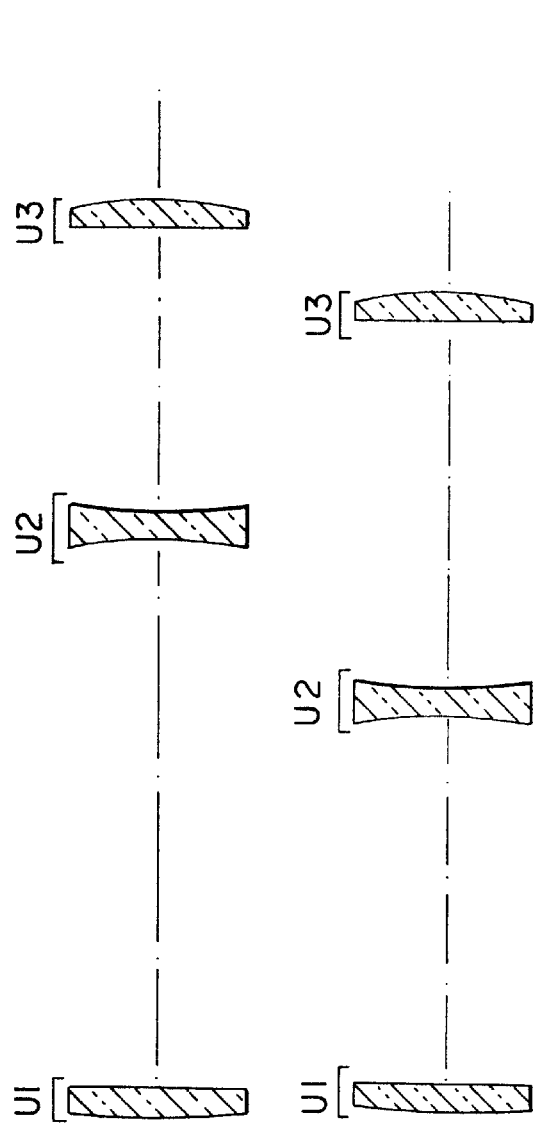
Fig. 6B
Fig. 6C
Fig. 6D

ZOOM LENS

FIELD OF THE INVENTION

This invention relates to a compact zoom lens. Although this invention has a general application, it is particularly suitable to zoom lenses with zoom ratios of 4× or greater.

BACKGROUND OF THE INVENTION

Zoom lenses having large zoom ratios are highly desirable. Zoom lenses with 2× to 3× zoom ratios are known. Many of them have relatively few lens elements (three to five) arranged into only two or three zooming lens units. U.S. Pat. No's. 5,327,290; 5,446,592 and 5,218,478 disclose such zoom lenses. However, these zoom lenses do not provide large enough zoom ratios and their structures can not be easily modified to provide larger zoom ratios.

Zoom lenses with larger zoom ratios (4×, 5× or greater) are also known. These zoom lenses are large, complex, expensive and have many lens elements. For example, U.S. Pat. No. 5,296,969 discloses a zoom lens with nine lens elements, U.S. Pat. No. 5,231,541 discloses a zoom lens with eight lens elements, U.S. Pat. No. 5,235,466 discloses a zoom lens with ten lens elements, U.S. Pat. No. 5,241,420 discloses a zoom lens with seventeen lens elements and U.S. Pat. No. 5,247,393 discloses a zoom lens with eleven lens elements. These zoom lenses have a small focal length and are principally applicable to CCD and video cameras with a small image format. If these zoom lenses were scaled up to cover a 135 mm image format, they would become very large and quite cumbersome to use.

SUMMARY OF THE INVENTION

It is an object of the present invention to produce a compact zoom lens providing a substantial zoom ratio with a minimum number of lens elements. Briefly described, a zoom lens according to the present invention comprises a plurality of lens elements arranged in at least two zooming lens units. The two zooming lens units are spaced from one another by an axial distance that varies during zooming. The zoom lens is characterized in that at least one of the zooming lens units moves for zooming in a first direction, then reverses the direction of movement to move in a second direction and then reverses direction again to move in the first direction.

According to one aspect of the present invention a zoom lens comprises at least two lens units. One of the lens units is movable between a first position wherein the zoom lens exhibits a first focal length and a second position wherein the zoom lens exhibits a second focal length. The zoom lens is characterized in that the one lens unit reverses direction at least twice during movement between the first and second position.

According to one embodiment of the present invention, the zoom lens satisfies the following equations:

Ft/Fw>3.0, and 0.8<Ft/FVTPt<1.2, where Ft is the focal length of the zoom lens in a telephoto position, Fw is the focal length of the zoom lens in a wide angle position, and FVTPt is the front vertex to image plane distance when the zoom lens is at the telephoto position.

According to one embodiment of the present invention, the zoom lens comprises three zooming lens units. They are: a front, positive power lens unit, a middle, negative power lens unit and a rear, positive power lens unit.

BRIEF DESCRIPTION OF THE DRAWINGS

The foregoing and other objects, features and advantages of the invention as well as presently preferred embodiments thereof will become more apparent from reading the following description in connection with the accompanying drawings.

FIGS. 3A–3D are side views of a zoom lens of the first embodiment.

FIGS. 5A–5D are side views of a zoom lens of a third embodiment.

FIGS. 6A–6D are side views of a zoom lens of a fourth embodiment.

DETAILED DESCRIPTION OF THE PREFERRED EMBODIMENT

Figure 1:
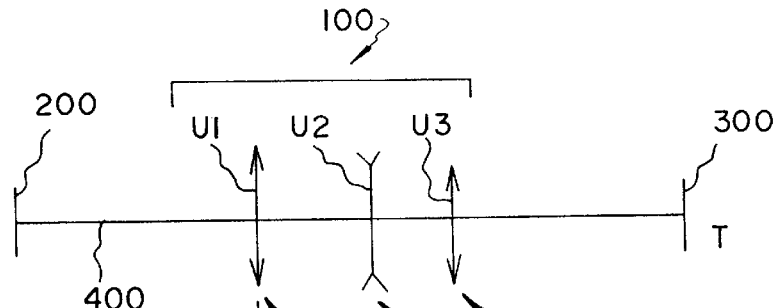
FIG. 1 is a schematic depiction of a lens unit arrangement in a first embodiment of a zoom lens.
Figure 2:
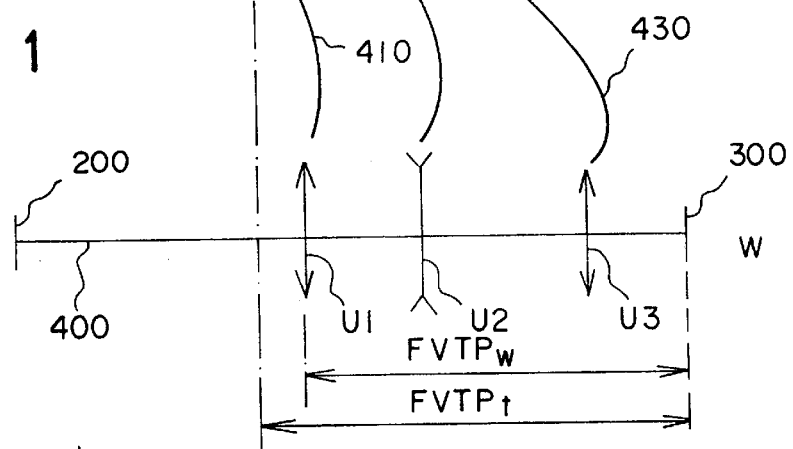
FIG. 2 is a schematic depiction of a lens unit arrangement in another embodiment of a zoom lens.
Figure 4A:
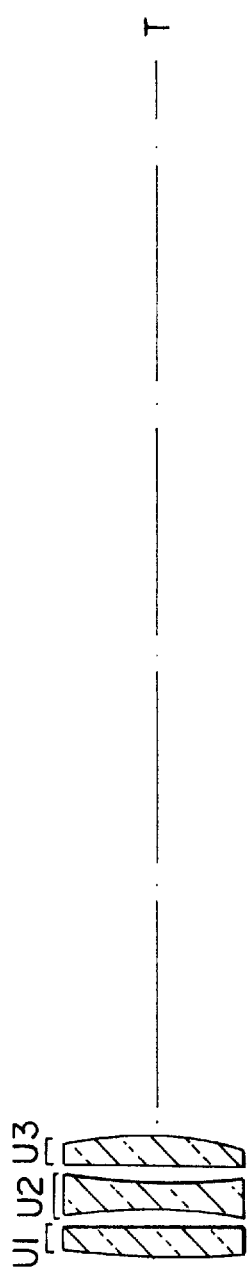
FIGS. 4A–4D are side views of a zoom lens of a second embodiment.
Figure 4B:
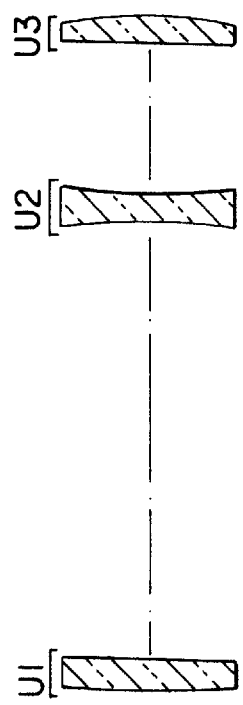
Figure 4C:
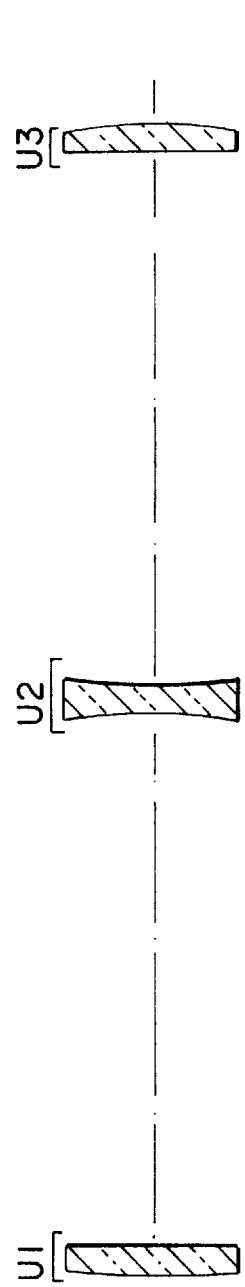
Figure 4D:
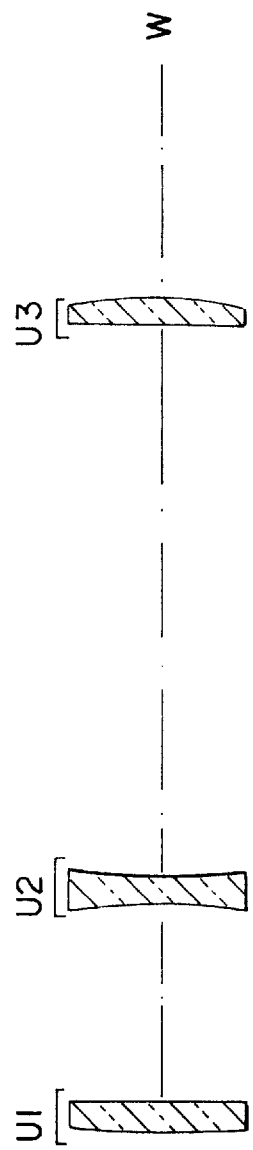
Figure 7A:
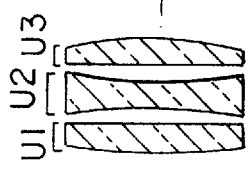
FIGS. 7A–7D are side views of a zoom lens of a fifth embodiment.
Figure 7B:
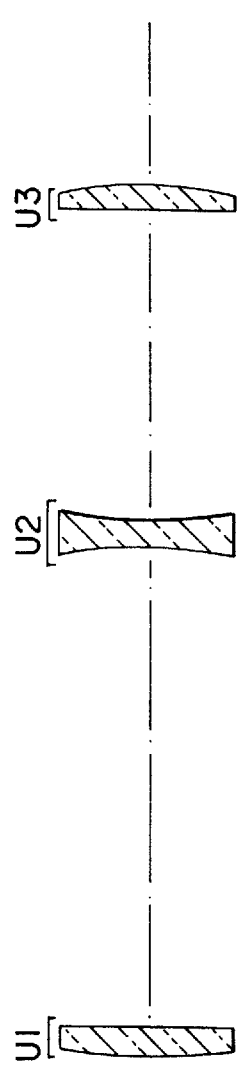
Figure 7C:
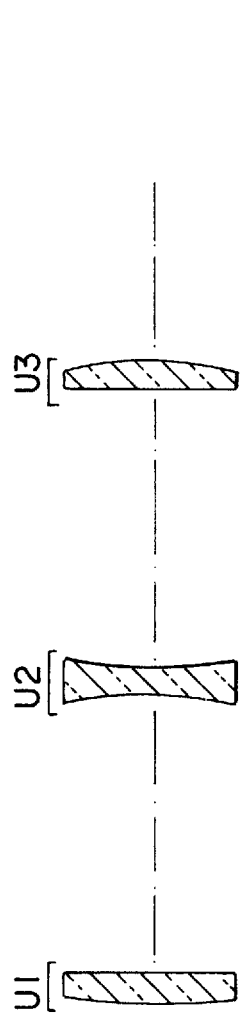
Figure 7D:
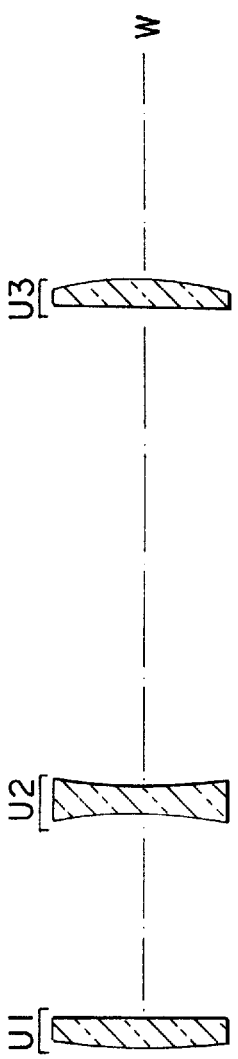

With reference to FIGS. 1 and 2, a zoom lens 100 for imaging an object 200 onto an image plane 300 comprises three axially movable zooming lens units U1, U2, and U3 arranged along an optical axis 400. The front (i.e., the most object side) lens unit U1 has positive optical power. The middle lens unit U2 has negative optical power. It is located between the front lens unit U1 and the rear lens unit U3. The rear lens unit U3 has positive optical power. Zoom lens 100 has a focal length f that varies from Ft to Fw. Ft is the focal length of the zoom lens in the (extreme) telephoto position and Fw is the focal length of the zoom lens in the (extreme) wide angle position. Zoom lens 100 has a zoom ratio of about 5× (i.e., Ft/Fw=5).

As zoom lens 100 zooms from a wide angle (f=Fw) to a mid zoom position (f=3×Fw), the middle zooming lens unit U2 moves through a location where it provides a magnification of one (m=1). It is preferred that the magnification provided by the middle lens unit U2 be one (m=1) when the zoom lens 100 is in its geometric middle focal length position (i.e. f=Fm1). The geometric middle focal length Fm1 is defined as Fm1=√(Ft+Fw)/2. Thus, if Ft is 5 and Fw is 1, then Fm1=√(5+1)/2=√3=1.7.

During the zooming motion of the middle lens unit U2, the front and the rear lens units U1 and U3 act as zooming compensators to maintain focus at the image plane 300. In approaching a lens focal length f that equals to 3×Fw, zooming motion of the three lens units changes, so that as zoom lens system 100 zooms from the mid zoom position (f=3×Fw) towards the telephoto position (f=Ft), the three lens units U1, U2 and U3 migrate simultaneously towards each other and away from the image plane 300. Thus, when the 5× zoom ratio is achieved, the distances between each of all three lens units (U1, U2, U3) are small.

Zoom lens 100 has a focal length Ft in the telephoto position that is approximately equal the distance FVTPt (see FIGS. 1 and 2). This distance is defined as a distance measured along the optical axis 400, from the front most vertex of the zoom lens 100 to the image plane 300, when the zoom lens 100 is in the telephoto position. Furthermore, in all other zoom positions, the front most vertex to the image plane distance FVTPo is approximately equal to the distance FVTPt. Thus, it is preferred that the zoom lens satisfy the following equation: 0.8<Ft/FVTPt<1.2 and that 0.8<FVFPo/FVTPt<1.3. It is even more preferred that 0.9<FVFPo/FVTPt<1.1. These conditions help the zoom lens to maintain its compactness in the telephoto position.

Table 1 specifies the respective focal lengths (F1, F2, F3) of the three lens units U1, U2, U3, for each the five zoom lens embodiments. Each of the zoom lens embodiments corresponds to a different value of a quantity K. The quantity K is defined as K=(FVFPm1)/(FVFPt). FVFPm1 is the axial distance measured from its front most vertex of the zoom lens to its image plane when the second lens unit U2 operates at a magnification m=1 and/or, when focal length of the zoom lens 100 is f=Fm1.

TABLE 1

| Embodiment | K | F1 | F2 | F3 |
|---|---|---|---|---|
| 1 | 1.1 | 4.3945 | −1.1110 | 1.2424 |
| 2 | 1.0 | 3.9917 | −1.0509 | 1.2079 |
| 3 | 0.9 | 3.5719 | −0.9823 | 1.1664 |
| 4 | 0.8 | 3.1295 | −0.9025 | 1.1150 |
| 5 | 0.7 | 2.6554 | −0.8067 | 1.0483 |

FIGS. 3A–3D, 4A–4D, 5A–5D, 6A–6D and 7A–7D correspond to the first through fifth zoom lens embodiments, respectively.

More specifically, FIGS. 3A, 4A, 5A, 6A and 7A, show locations of the zooming lens units U1, U2, and U3 when zoom lenses 100 are in their respective telephoto positions (f=Ft=5). FIGS. 3D, 4D, 5D, 6D and 7D show locations of the lens units U1, U2, U3 when zoom lenses 100 are in their respective wide angle positions (f=Fw=1). FIGS. 3B, 4B, 5B, 6B, 7B and 3C, 4C, 5C, 6C, 7C show the location of the lens units U1, U2, U3 when zoom lenses 100 are in the in intermediate zoom positions.

The analysis of the zooming movements of the zoom lens units of the five zoom lenses 100 with different K values (i.e., embodiments 1 through 5) indicated that for values of K between about 1.1 and about 0.8, the motion of the front zoom lens unit U1 is serpentine. That is, the front zoom lens units U1 moves (along an optical axis) in a first direction, then reverses the direction of the movement to move in a second direction and then reverses the direction again to move in the first direction. This motion is schematically illustrated by an arrow 410 in FIG. 1. The relative location of the three zooming units U1, U2 and U3 are shown in FIGS. 3A–3D, 4A–4D, 5A–5D. The motion of the rear lens unit U3 follows a "hook" like curve shown schematically by an arrow 430 (See FIG. 1). It is approximately linear when zoom lens 100 zooms from a telephoto (f=Ft) to an intermediate position (f=3×Fw) and approximately parabolic when zoom lens zooms from this intermediate position to the wide angle position, (in space-zoom position domain).

The analysis also showed that at a certain K value, around K=0.8, the motions of the rear and the front lens units start to reverse (FIGS. 6A–6D). At value of K=0.7, the motion of the front zoom lens unit U1 is linear-parabolic (following a "hook" like curve) and the motion of the rear lens unit U3 is serpentine. (See FIG. 2 and FIGS. 7A–7D).

The following tables provide the numerical data for the first, second, third, fourth and fifth zoom lens embodiments of the present invention. For purposes of simplification, each exemplary lens unit U1–U3 is only one (relatively thin) lens element. It is understood that, in order to provide a good field coverage, lens units of a zoom lens constructed in accordance with the present invention may comprise a plurality of lens elements. It is also understood that all of the parameters provided in the tables 2–6 can be scaled to provide 5× zoom lenses with different focal length values and that for zoom lens systems with relatively short focal lengths the thickness of these lens elements can be made greater relative to the zoom lens focal length in order to provide lens elements that are easily manufactured. It is also understood that these lens elements may have one or more aspheric and/or diffractive surface(s) in order to further improve quality of an image formed by the zoom lens. Also, for purposes of simplification, the first and the rear lens element are plano-convex and each lens element was chosen to have an index of refraction N=2.0. However, other lens element shapes and other indices of refraction can also be used.

TABLE 2 first zoom lens embodiment

| SURFACE # | RADIUS | THICKNESS th | INDEX |
|---|---|---|---|
| 0 |  | 1.0000e + 20 |  |
| 1 | 4.394488 | 0.100000 | 2 |
| 2 | infinity | 0.050000 |  |
| 3 | −2.246641 | 0.100000 | 2 |
| 4 | 2.246641 | 0.50000 |  |
| 5 | infinity | 0.100000 | 2 |
| 6 | −1.242377 | 5.261586 |  |

| f | th(2) | th(4) | th(6) |
|---|---|---|---|
| 5.0000 | 0.0500 | 0.0500 | 5.2616 |
| 3.0000 | 1.8526 | 0.6374 | 2.2778 |
| 1.7320 | 2.0978 | 2.0978 | 1.7320 |
| 1.0000 | 0.8315 | 2.0889 | 1.8473 |

TABLE 3 second zoom lens embodiment

| SURFACE | RADIUS | THICKNESS th | INDEX N |
|---|---|---|---|
| 0 |  | 1.0000e + 20 |  |
| 1 | 3.991673 | 0.100000 | 2 |
| 2 | infinity | 0.050000 |  |
| 3 | −2.126505 | 0.100000 | 2 |
| 4 | 2.126505 | 0.050000 |  |
| 5 | infinity | 0.100000 | 2 |
| 6 | −1.207916 | 5.262386 |  |

| f | th(2) | th(4) | th(6) |
|---|---|---|---|
| 5.0000 | 0.0500 | 0.0500 | 5.2624 |
| 3.0000 | 1.5033 | 0.5113 | 2.3851 |
| 1.7320 | 1.8152 | 1.8152 | 1.7321 |
| 1.0000 | 0.6718 | 1.8882 | 1.8398 |

TABLE 4 third zoom lens embodiment

| SURFACE | RADIUS | THICKNESS th | INDEX N |
|---|---|---|---|
| 0 |  | 1.0000e + 20 |  |
| 1 | 3.571869 | 0.100000 | 2 |
| 2 | infinity | 0.050000 |  |
| 3 | −1.989356 | 0.100000 | 2 |
| 4 | 1.989356 | 0.050000 |  |
| 5 | infinity | 0.100000 | 2 |
| 6 | −1.166431 | 5.263418 |  |

| f | th(2) | th(4) | th(6) |
|---|---|---|---|
| 5.0000 | 0.0500 | 0.0500 | 5.2634 |

TABLE 4-continued third zoom lens embodiment

| | | | |
|---|---|---|---|
| 3.0000 | 1.9450 | 0.8101 | 1.7320 |
| 1.7321 | 1.5325 | 1.5325 | 1.7320 |
| 1.0000 | 0.8115 | 1.9456 | 1.7327 |

TABLE 5 fourth zoom lens embodiment

| SURFACE # | RADIUS | THICKNESS th | INDEX N |
|---|---|---|---|
| 0 | | 1.0000e + 20 | |
| 1 | 3.129501 | 0.100000 | 2 |
| 2 | infinity | 0.050000 | |
| 3 | −1.829600 | 0.100000 | 2 |
| 4 | 1.829600 | 0.050000 | |
| 5 | infinity | 0.100000 | 2 |
| 6 | −1.114964 | 5.264817 | |

| f | th(2) | th(4) | th(6) |
|---|---|---|---|
| 5.0000 | 0.0500 | 0.0500 | 5.2648 |
| 3.0000 | 1.8667 | 0.9612 | 1.4533 |
| 1.7321 | 1.2499 | 1.2499 | 1.7320 |
| 1.0000 | 0.7830 | 1.8426 | 1.6556 |

TABLE 6 fifth zoom lens embodiment

| SURFACE # | RADIUS | THICKNESS th | INDEX N |
|---|---|---|---|
| 0 | | 1.0000e + 20 | |
| 1 | 2.655385 | 0.100000 | 2 |
| 2 | infinity | 0.050000 | |
| 3 | −1.638009 | 0.100000 | 2 |
| 4 | 1.638009 | 0.050000 | |
| 5 | infinity | 0.100000 | 2 |
| 6 | −1.048280 | 5.266861 | |

| f | th(2) | th(4) | th(6) |
|---|---|---|---|
| 5.0000 | 0.0500 | 0.0500 | 5.2669 |
| 3.0000 | 1.6655 | 1.0673 | 1.2077 |
| 1.7320 | 0.9674 | 0.9674 | 1.7320 |
| 1.0000 | 0.7078 | 1.6626 | 1.5701 |

The invention has been described in detail with particular reference to certain preferred embodiments thereof, but it will be understood that variations and modifications can be effected within the spirit and scope of the invention.

Figure 8:
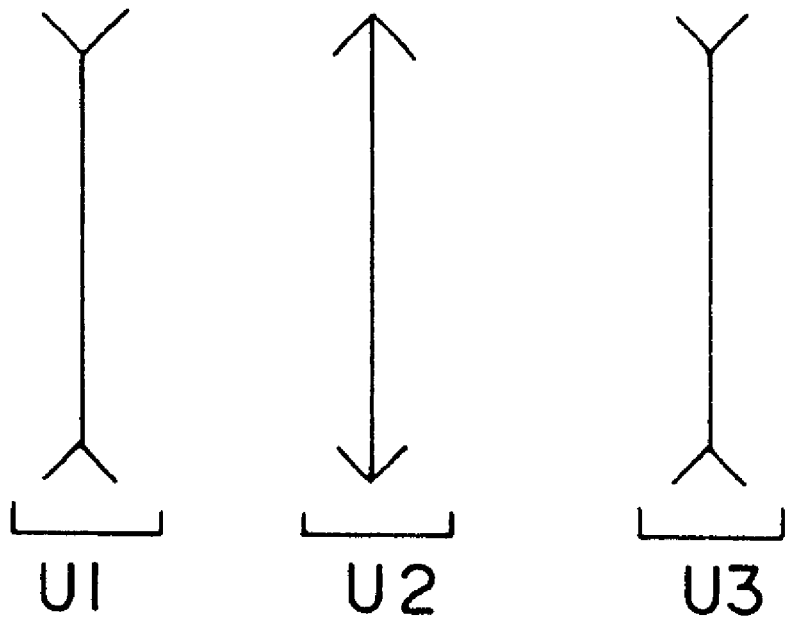
FIG. 8 illustrates a schematic arrangement of lens units in yet another embodiment of a zoom lens.

For example, a zoom lens system according to this invention may include more than three lens units. Also, for example, a lens system with a negative, positive and negative power lens units, as shown in FIG. 8, may also utilize a serpentine motion. Also, a compensating zooming lens unit may reverse directions more than twice. Finally, more than one zooming lens unit may have the above disclosed serpentine motion. These improvements would enable a zoom lens to better maintain the image position on film or other photo sensitive medium, to further improve image quality, and/or to provide a zoom ratio of 5× or greater.

PARTS LIST 100 zoom lens
U1 front lens units
U2 middle lens unit
U3 rear lens unit
200 object
300 image plane
400 optical axis

What is claimed is:

1. A zoom lens having a focal length that changes from one zoom position to another zoom position, said zoom lens comprising a plurality of lens elements arranged in only three lens units, said lens units being spaced from one another by an axial distance that varies during zooming, at least one of said zooming lens units moves for zooming in a first direction, then reverses direction of movement to move in a second direction and then reverses direction again to move in said first direction to provide a predetermined zoom ratio.

2. A zoom lens according to claim 1 wherein said zooming lens units, from an object side, are:

a positive power front lens unit;

a negative power middle lens unit; and a positive power rear lens unit.

3. A zoom lens according to claim 2 wherein $0.9 < FVFPo/FVTPt < 1.1$.

4. A zoom lens having a focal length that changes from one zoom position to another zoom position, said zoom lens comprising a plurality of lens elements arranged in at least two zooming lens units spaced from one another by an axial distance that varies during zooming, at least one of said zooming lens units moves for zooming in a first direction, then reverses direction of movement to move in a second direction and then reverses direction again to move in said first direction to provide a predetermined zoom ratio, said zoom lens satisfying the following inequalities $Ft/Fw > 3.0$, and $0.8 < Ft/FVTPt < 1.2$, where;

Ft is the focal length of said zoom lens in a telephoto position,

Fw is the focal length of said zoom lens in a wide angle position, and FVTPt is a front vertex to image plane distance when said the zoom lens is in the telephoto position.

5. A zoom lens according to claim 4 wherein said zooming lens units, from an object side, are:

a positive power front lens unit;

a negative power middle lens unit; and a positive power rear lens unit.

6. A zoom lens according to claim 5 wherein $0.8 < FVFPo/FVTPt < 1.2$, where FVFPo is a front vertex to image plane distance when the zoom lens is in any zoom position other than the telephoto position.

7. A zoom lens according to claim 6 wherein $0.9 < FVFPo/FVTPt < 1.1$.

8. A zoom lens according to claim 4 wherein $0.8 < FVFPo/FVTPt < 1.2$, where FVFPo is a front vertex to image plane distance when the zoom lens is in any zoom position other than the telephoto position.

9. A zoom lens consisting of at most three lens units, one of said lens units being movable between a first position wherein the zoom lens has a first focal length and a second position wherein the zoom lens has a second focal length; characterized by said one of said lens units reverses direction at least twice during movement between said first and second positions.

10. A zoom lens comprising a plurality of lens elements arranged in at least two zooming lens units, said zooming lens units being arranged to provide at least four zoom positions, each corresponding to a predetermined focal length different from other focal lengths, said zooming lens units being spaced from one another by an axial distance that varies during zooming, such that at least one of said zooming lens units moves for zooming in a first direction, then reverses direction of movement to move in a second direction and then reverses direction again to move in said first direction to provide a predetermined zoom ratio.

11. A zoom lens according to claim 10, wherein

Ft/Fw>3.0, and 0.8<Ft/FVTPt<1.2, where

Ft is the focal length of said zoom lens in a telephoto position,

Fw is the focal length of said zoom lens in a wide angle position, and FVTPt is a front vertex to image plane distance when said the zoom lens is in the telephoto position.

* * * * *